(12) United States Patent
Konishi et al.

(10) Patent No.: US 7,841,580 B2
(45) Date of Patent: Nov. 30, 2010

(54) PRESSURIZED FLUID COUPLER WITH ANTI-RECOIL FEATURE AND METHODS

(75) Inventors: M. Howard Konishi, Bothell, WA (US); Edwin Huncovsky, Redmond, WA (US)

(73) Assignee: Macro Technologies, Inc., Kirkland, WA (US)

(*) Notice: Subject to any disclaimer, the term of this patent is extended or adjusted under 35 U.S.C. 154(b) by 311 days.

(21) Appl. No.: 11/406,804

(22) Filed: Apr. 18, 2006

(65) Prior Publication Data
US 2007/0001143 A1 Jan. 4, 2007

Related U.S. Application Data

(60) Provisional application No. 60/672,700, filed on Apr. 18, 2005.

(51) Int. Cl.
*F16L 37/28* (2006.01)

(52) U.S. Cl. .................. 251/149.6; 251/149.1

(58) Field of Classification Search .... 137/614–614.05, 137/515, 515.5; 251/149.1, 149.6
See application file for complete search history.

(56) References Cited

U.S. PATENT DOCUMENTS

| | | | | |
|---|---|---|---|---|
| 3,498,324 A | * | 3/1970 | Breuning ............ | 137/614.04 |
| 4,249,572 A | * | 2/1981 | Shindelar et al. ....... | 137/614.04 |
| 4,582,295 A | * | 4/1986 | Kugler et al. .......... | 137/614.04 |
| 4,664,148 A | * | 5/1987 | Magnuson ............ | 137/614.05 |
| 4,745,948 A | * | 5/1988 | Wilcox et al. ......... | 137/614.05 |
| 4,946,455 A | * | 8/1990 | Rosen .................. | 137/614.04 |
| 5,063,965 A | * | 11/1991 | Wilcox ................. | 137/614.03 |
| 6,095,190 A | * | 8/2000 | Wilcox et al. ......... | 137/614.04 |
| 6,135,150 A | * | 10/2000 | Powell et al. .......... | 137/614.04 |
| 6,148,858 A | * | 11/2000 | Kirkman .............. | 137/614.02 |
| 6,394,131 B1 | * | 5/2002 | Fross et al. ........... | 137/614.05 |
| 6,637,460 B2 | * | 10/2003 | Haunhorst ............ | 137/614.03 |
| 6,675,833 B2 | * | 1/2004 | Maldavs ............... | 137/614.05 |
| 6,729,348 B1 | * | 5/2004 | Alexandre ............ | 137/614.05 |
| 6,830,059 B1 | * | 12/2004 | Zeiber et al. .......... | 137/614.03 |

* cited by examiner

*Primary Examiner*—John Rivell
*Assistant Examiner*—Craig Price
(74) *Attorney, Agent, or Firm*—Dylan O. Adams; Graybeal Jackson LLP

(57) ABSTRACT

The invention is directed to apparatus and methods for reducing recoil during uncoupling of pressurized couplers. The apparatus includes a male: a female component; and a check valve fluidly disposed between a proximal end and a distal end within one of the male component or female component. When the component including the check valve is pressurized, the check valve assumes a normally closed state. Upon coupling of the male component with the female component, the check valve is caused to open through the interaction of a probe linked to the check valve which contacts a portion of the opposing coupler, thereby opening the check valve and permitting pressurized fluid flow between the two components. At least one radially directed port fluidly couples the interface between the male and female couplers with the environment, which may be formed in one or both couplers.

10 Claims, 5 Drawing Sheets

PRESSURIZED FLUID COUPLER WITH ANTI-RECOIL FEATURE AND METHODS

CROSS-REFERENCE To RELATED APPLICATION

This is a utility application that claims benefit, under 35 USC §119(e), of U.S. provisional patent application No. 60/672,700, filed 18 Apr. 2005, which application is incorporated herein by reference.

BACKGROUND OF THE INVENTION

Conventional multi-component, pressurized couplers encounter a recoil effect when uncoupled, unless at least one pressurized line linked to the coupler is bled. In order to carry out such bleeding, additional structure such as shut-off valves and the like are usually needed. If at least one pressurized line is not bled prior to decoupling, then the pressurized gas or fluid is ejected from both coupler components. As required by Newton's second law, both coupler components will thereafter experience a recoil force (hereinafter a Newton recoil force), with the component having an unchecked reservoir of pressurized fluid being the most affected. In certain environments wherein high-pressure fluids are present, such as the high pressure circuit of compressed gas cylinders wherein pressures can reach as high as 3500 psig, the recoil force can be significant and, if not arrested, injury to persons or property can result.

Another recoil force relates to a pressure build-up between the two components after mechanical decoupling and disengagement of a check valve commonly found with respect to multi-component pressurized couplers. In this scenario, pressurized fluid is allowed to escape the confines of a closed system and hydraulically or pneumatically separate the components, much like the expanding gasses in a firearm causes the load to be propelled from the barrel. This recoil force (hereinafter a Boyle recoil force) also can result in injury to persons or property if not arrested or minimized.

While one solution is to provide check valves in each component, this approach complicates the coupler, thereby increasing its costs and potential for malfunction. Thus, a simple solution is needed for reducing or minimizing coupler component recoil during decoupling.

SUMMARY OF THE INVENTION

The invention is directed to apparatus and methods for reducing recoil during uncoupling of pressurized couplers. The apparatus comprises a male component having a fitting orifice at a proximal end and a nozzle orifice at a distal end, a female component having a fitting orifice at a proximal end and a receiving orifice at a distal end, and a check valve fluidly disposed between the proximal end and the distal end within one of the male component or female component. When the component including the check valve is pressurized, the check valve assumes a normally closed state, thus preventing escape of pressurized fluid upstream of the check valve. Upon coupling of one component with the complementary component, the check valve is caused to open through the interaction of a probe linked to the check valve which contacts a portion of the male coupler, thereby opening the check valve and permitting pressurized fluid flow between the two components.

The apparatus further comprises a pressure relief feature that permits the escape of pressurized fluid between the period of check valve disengagement and complete decoupling of the two components. As is known in the art, the component having the check valve will not undergo significant self-induced recoil, because the amount of pressurized fluid present between the check valve and the component's distal end is generally small. However, the non-checked component has a comparatively large reservoir of pressurized fluid, whose only means of escape is through that coupler's distal end. As a result, pressurized fluid escaping from the component orifice will result in an opposite force being applied to the component and any associated fluid delivery system(s). Moreover, fluid expelled from the non-checked component will impinge upon the other component, thereby inducing a pseudo-recoil force thereat. Depending upon the mode of implementation, the aforementioned pressure relief feature is intended to reduce the self-induced recoil force, the induced pseudo-recoil force, or both, as well as the Boyle recoil effect, which will be described in more detail below.

At least one of the two components defines a volume, and preferably, but not necessarily, the volume is defined in substantial part by the female component where the volume is normally occupied by the male distal end component during use. This volume is characterized as possessing pressurized fluid during the initial disengagement of the check valve due to the presence of pressurized fluid downstream of the check valve. The pressure relief feature comprises a fluid path between this volume and the environment, wherein the portion of the fluid path exposed to the environment (exhaust port(s)) at least does not contribute to any recoil force, and preferably operates to reduce such force. Thus, an exhaust port may cause ejected fluid to be directed in a manner to reduce the recoil force resulting from decoupling of the coupler. As described previously, the pressure relief feature may be part of either or both coupler components.

In many applications, the female component will be fluidly coupled to a source of pressurized fluid, which, for purposes of the instant example in this disclosure, is a gas. A check valve or equivalent structure is incorporated into the female component between the source of pressurized gas and a main orifice of the female component, thereby preventing escape of the pressurized gas from the source. Upon insertion of the male component, a suitable seal there between is created, the check valve is caused to open and the two components are mechanically engaged with each other. Subsequent to this, compressed gas enters the male component and is delivered according to system requirements. The decoupling process is similar but operates in reverse. However, as soon as the mechanical engagement between the two components is removed, there is a bias in favor of component separation. This bias, derived from Boyle's Law (an increase in pressure will cause a corresponding increase in volume, if possible), attempts to increase the volume defined by the component by separating the two components. Because the pressure relief feature exposes the volume to the environment, the pressure increase in the volume is rapidly countered by this bleeding of compressed gas.

In several embodiments, the pressure relief feature is present in the male component. A fluid conduit is established at or near the distal end thereof and is in fluid communication with the environment. Thus, because the distal end of the male component forms part of the volume from initial decoupling through final separation, expanding gas can quickly pass from the volume to the environment. In certain embodiments, the ported gas is ejected in a direction the same as the component recoil vector, thereby providing a counter force thereto. In other embodiments, a portion of the female component that defines the volume comprises a fluid conduit that is in fluid communication with the environment. Again, the ported gas may be ejected in a direction the same as the component recoil vector, thereby providing a counter force thereto. In still other embodiments, the pressure relief feature is present in both components.

The pressure relief feature beneficially addresses the Boyle recoil effect by minimizing the degree of unchecked pressure build-up between the two components after initial decoupling of the check valve. Moreover, a directed port, pressure relief feature associated with the component not possessing a check valve will address the Newton recoil effect by actively countering the component recoil resulting from pressurized fluid exiting the distal end.

DETAILED DESCRIPTION OF A PREFERRED EMBODIMENT

Figure 1:
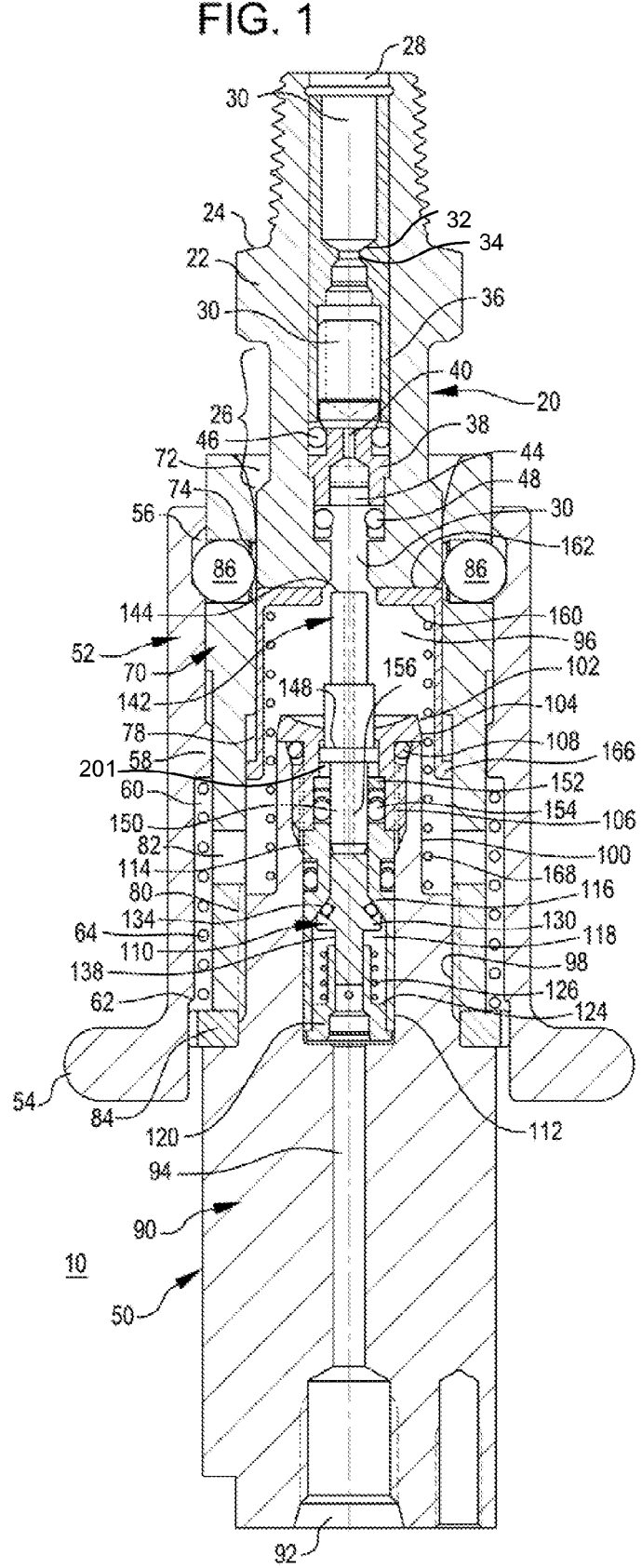
FIG. 1 is a detailed cross section view of male coupler fitting and a female coupler fitting according to an embodiment of the invention, particularly detailing a first step engagement (or second step disengagement) between the male fitting and the female fitting.

The following discussion is presented to enable a person skilled in the art to make and use the invention. Various modifications to the preferred embodiment will be readily apparent to those skilled in the art, and the generic principles herein may be applied to other embodiments and applications without departing from the spirit and scope of the present invention as defined by the appended claims. Thus, the present invention is not intended to be limited to the embodiment show[n], but is to be accorded the widest scope consistent with the principles and features disclosed herein.

Turning then to the several Figures, wherein like numerals indicate like parts, and more particularly to F*i*g.1, coupler assembly 10 is shown in cross section for ease of viewing. Coupler assembly 10 comprises male fitting 20 and female fitting 50, which are intended to link to sources of high pressure fluid such as compressed gas, via threaded port 28 and threaded port 92, respectively. Unless otherwise noted or contrary to convention, all components are constructed from a durable material such as steel, aluminum or other metal, and may be surface treated such as by plating or anodizing, depending upon design considerations.

Referring first to male fitting 20, it comprises body 22, which includes outer surface 24, and annular recess 26. Body 22 also defines internal bore 30. Fitted within bore 30 are cylindrical insert 36 and seat member 38. These components in turn define fluid passage 40. O-ring 46 provides a sealing arrangement between seat member 38 and body 22, while 0-ring 48 provides a sealing arrangement between probe 142 and recess 44. It should be noted that in the illustrated embodiment, all parts described with reference to male fitting 20 are static during coupling and decoupling operations, thereby reducing the complexity and increasing the durability of the fitting.

Turning then to female fitting 50, it comprises several main components, namely, sleeve 52, collar 70, body 90, poppet assembly 110, and probe 142. Referring first to sleeve 52, the exterior thereof includes annular gripping rib 54, which provides a convenient means for a user to reciprocate sleeve 52 and counter the bias provided by compression spring 64. The interior surface of sleeve 52 includes several features to facilitate operation of the illustrated embodiment. First, annular groove 56 provides a location for balls 86 to reside when disengaging from annular recess 26 of male fitting 20. Second, annular land 58 provide a reactive surface for compression spring 64 on one side thereof and provides a stopping surface for collar 70, thereby preventing over translation of sleeve 52 relative to collar 70. Third, annular recess 60 provides a space for compression spring 64. Finally, step 62 abuts ported ring 84 when sleeve 52 is in the fully retracted position, thereby preventing over translation in the retraction direction.

Figure 5:
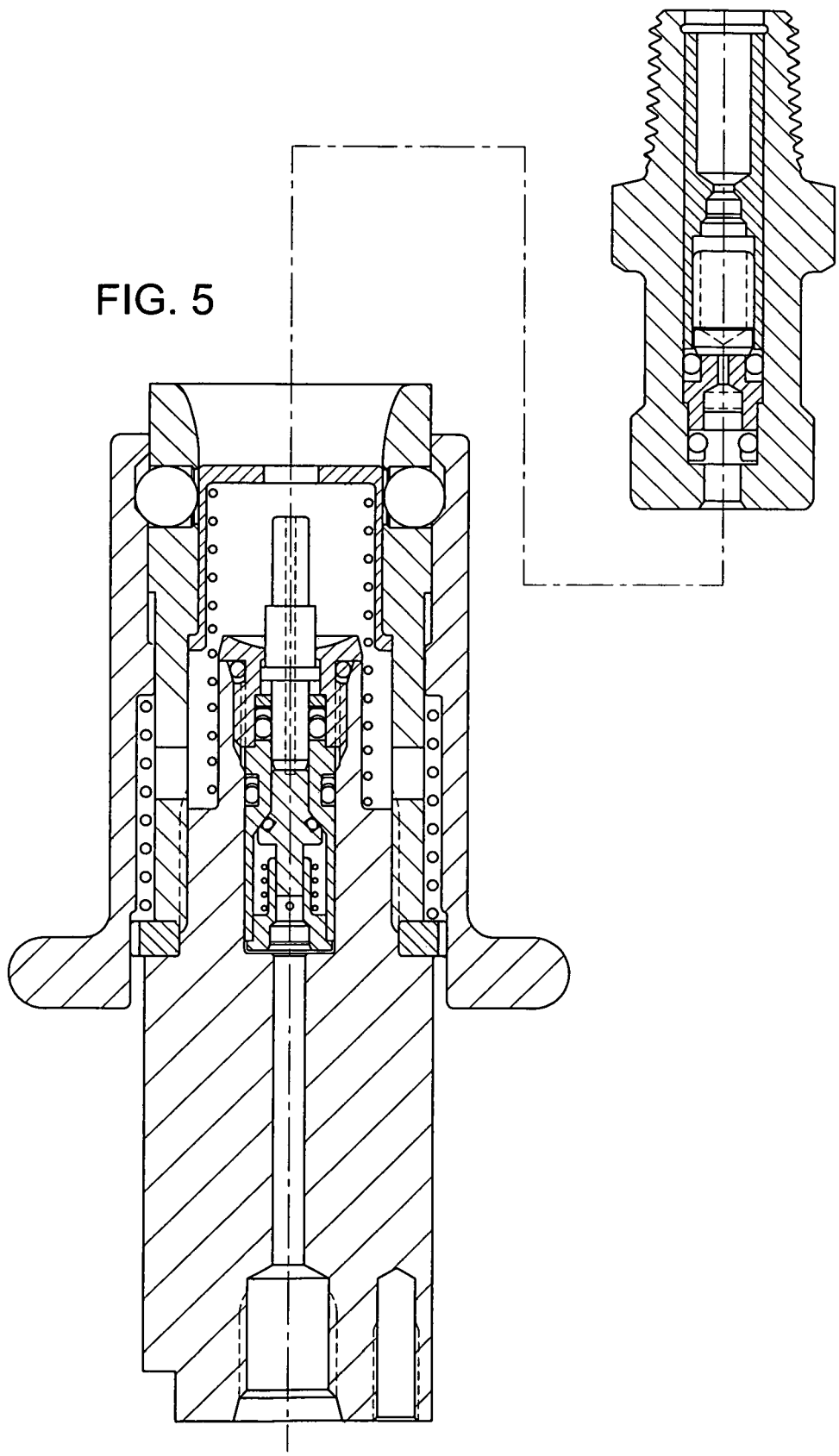
FIG. 5 shows the male and female fittings of the embodiment of FIG. 1 in a fully decoupled state, with reference numerals being omitted for clarity.

Collar 70, which is threadably coupled to body 90 via threaded portion 80, performs several functions. One function is to guide male fitting 20 into an operative relationship with female fitting 50. To this end, collar 70 includes flared opening 72, which extends to second cavity 96. As previously intimated, it further provides means for removably coupling male fitting 20 to female fitting 50 via captive balls 86, which are disposed in a plurality of circumferentially spaced holes 74. Thus, when male fitting 20 is inserted sufficiently far into female fitting 50, as will be described in more detail below with reference to FIG. 2, balls 86 occupy recess 26 and are prevented from leaving the recess by the interior surface of sleeve 52. Also, and as previously described, collar 70 functions to modulate the degree of axial translation of sleeve 52. Furthermore, and in cooperation with annular ring or flange 166 of hat 160, it limits overextension of hat 160 at annular recess 78 when male fitting 20 is removed from female fitting 50 (see FIG. 5). In addition, collar 70 includes a plurality of radially directed ports 82, which as will be shown below, permit escape of pressurized fluid in second cavity 96 into the ambient environment through ported ring 84.

Body 90, which houses poppet assembly 110, and defines a first cavity 201, includes previously described threaded bore 92 for coupling to a high pressure fluid conduit. Body 90 further defines passage 94 through which pressurized fluid can pass to or from poppet assembly 110. To house this assembly, it defines primary recess 96, into which poppet assembly 110 fits. External features of body 90 include recuced diameter portion 98, which has external threads for engaging with threaded portion 80 of collar 70, and reduced diameter portion 100, which permits movement of hat 160 and compression spring 168 therein.

Figure 2:
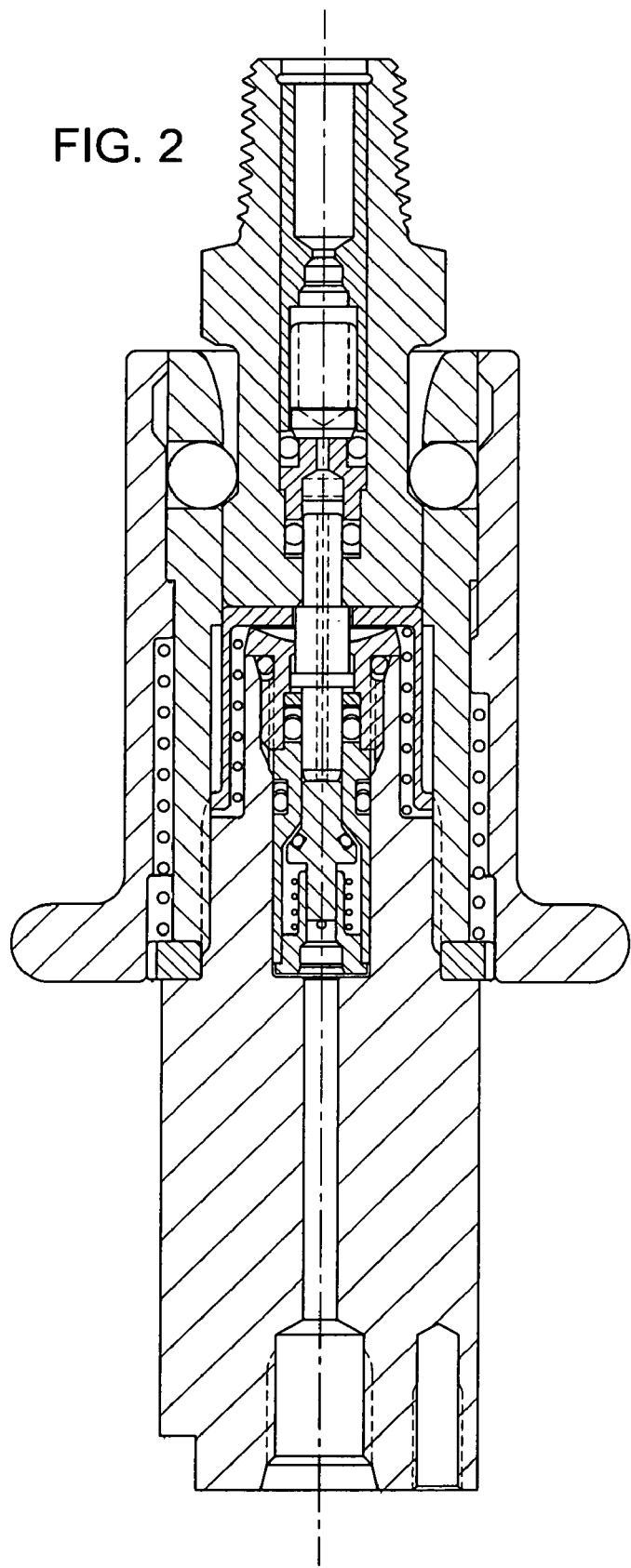
FIG. 2 shows the male and female fittings of the embodiment of FIG. 1 in a fully coupled state, with reference numerals being omitted for clarity.

Both poppet assembly 110 and probe 142 are captively held by flange 102, although probe 142 is permitted to axially translate therein. Flange 102 include annular rib 104 to prevent unchecked axial translation of probe 142 through contact with annular land 148 of probe 142, and external threads 106 to permit threadable engagement with body 90. 0-ring 108 provides a fluid-tight seal between flange 102 and body 90. Probe 142 further includes distal end 144, which engages with O-ring 48 as best shown in FIG. 2 to permit fluid communication between passage 94 and bore 30 Seal 152 and 0-ring 154 ensure that pressurized fluid does not unintentionally escape from first cavity 118 and into second cavity 96. Importantly, probe 142 includes fluid conduit 156 to establish fluid coupling between port 28 and port 92 when poppet assembly 110 is open, as shown in FIG. 2.

As particularly shown in FIG. 2, poppet assembly 110 opens to fluid flow when poppet member 130 is axially displaced from frusto-conical seat face 116, such as when cylinder portion 150 of probe 142 overcomes the spring bias of compression spring 126 or when fluid pressure in passage 94 is overcome. In addition to poppet member 130, poppet assembly 110 comprises body 112, which defines annular land 114 to provide a reactive surface against flange 102, and internally defines previously referenced frusto-conical seat face 116, and further comprises base 120. Base 120 provides location for cylindrical portion 138 of poppet member 130, as well as location for compression spring 126. Compression spring 126, in turn, reacts against step 124 and poppet member 130 to urge the same into a normally closed position, i.e., where frusto-conical face 134 and associated seal firmly press against complementary frusto-conical seat face 116 of body 112.

To protect probe 142 from unintentional damage, hat 160 is provided. Compression spring 168 biases face 162 towards the distal end of female fitting 50. Because face 162 extends beyond distal end 144 of probe 142, the probe is suitably shielded from damage when male fitting 20 is not coupled to female fitting 50. However, upon presentation of male fitting 20 into flared opening 72 of collar 70, hat 160 is urged towards poppet assembly 110, which causes face 162 to depend past distal end 144 and expose the same to seat member 38.

Figure 3:
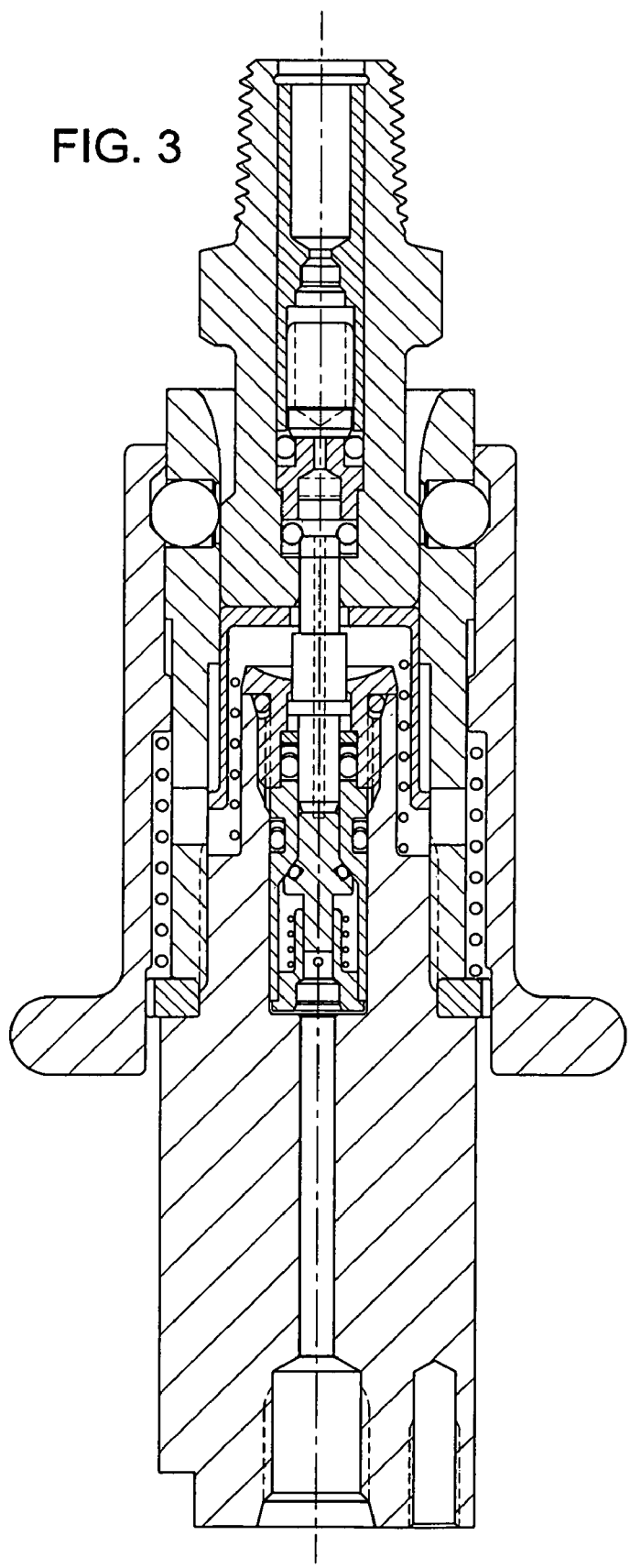
FIG. 3 shows the male and female fittings of the embodiment of FIG. 1 in a second step engagement (or first step disengagement) between the male fitting and the female fitting, with reference numerals being omitted for clarity.
Figure 4:
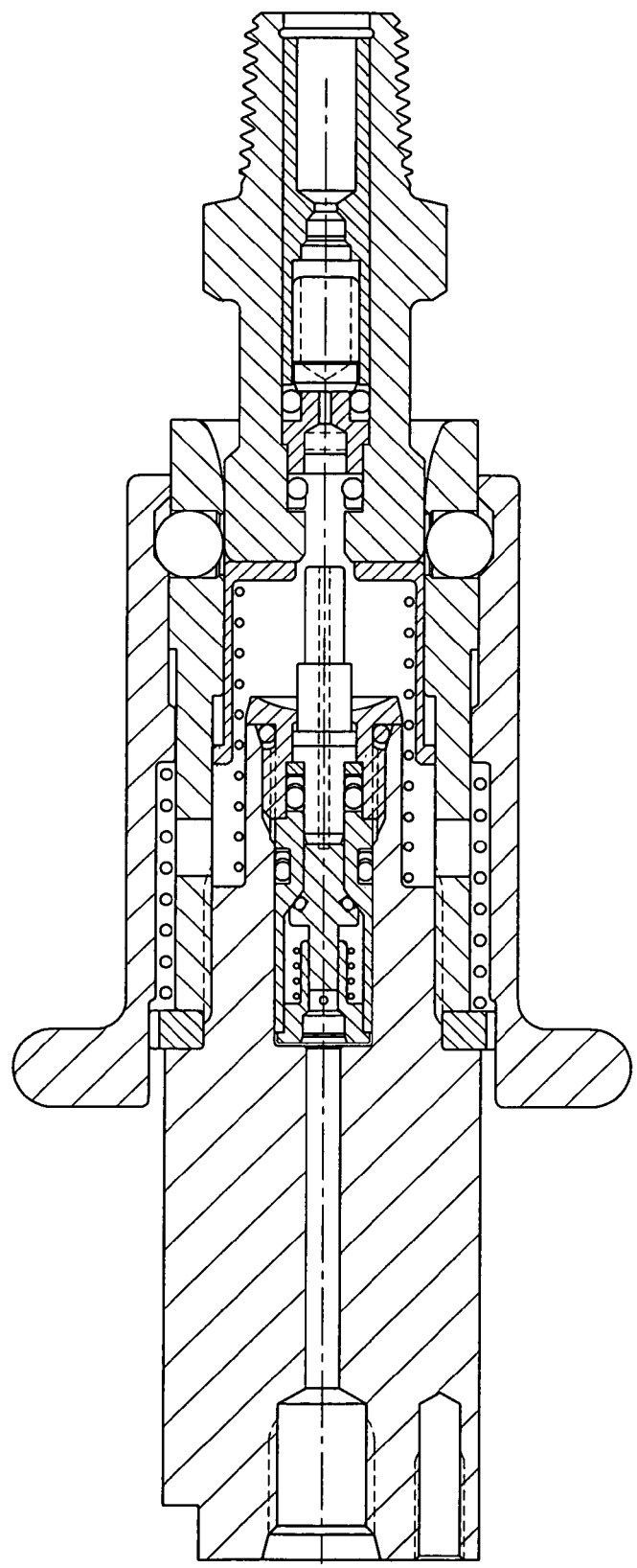
FIG. 4 re-presents the male and female fittings in the state shown in FIG. 1, with reference numerals being omitted for clarity.

When fittings 20 and 50 are initially disengaged after delivery of pressurized gas, a state that is best shown in FIG. 3, pressurized gas residing in conduit 156 through to and past port 28 will escape from conduit 156 and passage 40, and will enter into second cavity 96. Unlike the prior art, however, which would then cause fittings 20 and 50 to perhaps violently separate, the pressurized gas is permitted to expand and escape to the ambient environment via radially directed ports 82 and into annular recess 60, which is in fluid communication with the environment via ported ring 84. In this manner, axial separation force is minimized and escape of the outgoing pressurized gas is directed in a radial direction.

What is claimed:

1. A coupler fitting for high pressure fluids comprising:
    a body having an axis and defining a passage from a proximal end through which fluid enters the body to a distal end through which fluid exits the body, and further defining a first cavity;
    a check valve openable by a force directed towards the proximal end of the body and occupying the first cavity;
    a probe exposed at a proximal end to the check valve and extending at a distal end past the first cavity; and
    a collar at least partially surrounding the body and defining a portion of a second cavity at the distal end of the body into which the distal end of the probe extends, wherein a fluid pathway is created between the second cavity and an ambient environment through at least one port defined by the collar having a direction of fluid exit not equal to the axial direction of the coupler fitting.

2. The coupler fitting of claim 1 wherein the probe defines a fluid conduit between the check valve and the second cavity.

3. The coupler fitting of claim 1 further comprising a translatable hat to protect the probe when the coupler fitting is not in use.

4. The coupler fitting of claim 3 wherein the hat comprises an axially aligned opening through which the distal end of the probe may pass.

5. The coupler fitting of claim 3 wherein the hat is biased away from the proximal end of the probe by a spring.

6. The coupler fitting of claim 5 wherein the spring is in compressive contact with a portion of the hat and with a portion of the body, and wherein over extension of the hat is prevented by an abutting relationship between the hat and the collar.

7. The coupler fitting of claim 1 wherein the collar further comprises an engagement means for securingly connecting the coupler fitting to another coupler fitting.

8. The coupler fitting of claim 7 wherein the engagement means comprises at least one captive ball that is radially translatable between a first position wherein a portion of the at least one ball is within the boundaries of the second cavity and a second position wherein no portion of the at least one ball is within the boundaries of the second cavity.

9. The coupler fitting of claim 1, wherein said check valve comprises a poppet.

10. The coupler fitting of claim 1, wherein said fluid is a gas.

* * * * *